Patented Apr. 9, 1940

2,196,602

UNITED STATES PATENT OFFICE 2,196,602

COMPOSITION OF MATTER

Arthur W. Browne, Akron, Ohio, assignor to The B. F. Goodrich Company, New York, N. Y., a corporation of New York No Drawing. Application January 27, 1938, Serial No. 187,243

5 Claims. (Cl. 260—32)

This invention relates to the polymerized chlorobutadiene known as neoprene, and has as its object to provide non-toxic solvents therefor.

It has long been known that neoprene would dissolve in benzene, carbon tetrachloride, and other chlorinated hydrocarbons. Such solutions have been extensively used to make paints and cements for impregnating and coating many different articles. The use of these toxic solvents, however is a serious industrial hazard, and should be avoided whenever possible.

According to this invention, neoprene is dissolved in a solvent consisting solely or partially of a liquid member of the class consisting of aliphatic and alicyclic ketones.

The preferred ketones are those containing at least four carbon atoms. Included among the best ketone solvents are methyl propyl ketone, methyl isopropyl ketone, di-isopropyl ketone, and mesityl oxide. The alicyclic ketones such as cyclohexanone are also excellent solvents for neoprene.

The solvents of this invention need not be used alone, but are often advantageously used in connection with other solvents with excellent results. The danger due to the toxicity of the ordinary solvents is often decreased by employing it in admixture with one of the non-toxic ketones.

For crude neoprene, di-isopropyl ketone and mesityl oxide are excellent solvents producing very satisfactory 10% solutions in short times. A good cement was prepared by dissolving neoprene in a mixture of equal parts by volume of isopropyl acetate and methyl ethyl ketone. An excellent faster drying cement was made by dissolving neoprene in a mixture of equal parts by volume of methyl ethyl ketone and gasoline in a concentration of ½ lb. of neoprene per gallon of solvent.

Neoprene is usually used in a compounded form, so it is important that any solvent dissolve neoprene compositions as well as the crude plastic. The following composition was prepared:

| | |
|---|---|
| Neoprene | 41.80 |
| Magnesium oxide | 2.10 |
| Gas black | 42.90 |
| Cumar resin | 8.35 |
| Rosin oil | 4.00 |
| Phenyl-beta-naphthylamine | 0.85 |
| | 100.00 |

Tests were run by immersing a 10 gram sample of the above composition in various solvents and agitating until the neoprene had dissolved. This composition dissolved in methyl propyl ketone, and di-isopropyl ketone in the same length of time (2 hours) necessary to effect solution in more toxic materials such as carbon tetrachloride.

A solution containing vulcanizing agents like the one prepared above may be applied to a surface and heated to drive off the solvent and simultaneously vulcanize the neoprene.

An excellent adhesive solution was obtained by making a 10% solution of a composition containing neoprene 90 parts by weight and rosin 10 parts by weight in a mixture of equal parts of methyl ethyl ketone and gasoline. This composition, when dried, adhered strongly to surfaces on which it had deposited.

Compositions containing rubber and neoprene are often employed to utilize in one material the advantages of each. The following rubber composition was prepared:

| | |
|---|---|
| Rubber | 61.15 |
| Gas black | 22.20 |
| Zinc oxide | 3.00 |
| Hardwood pitch | 6.50 |
| Pine tar | 2.25 |
| Cottonseed fatty acid | 2.00 |
| Sulfur | 2.00 |
| Phenyl-beta-naphthylamine | 0.50 |
| Mercaptobenzothiazole | 0.40 |
| | 100.00 |

50 parts by weight of this composition were mixed with 50 parts of the neoprene composition previously prepared. This mixture was dissolved in methyl propyl ketone to give a good cement. This mixture of rubber and neoprene are dissolved satisfactorily in solvents containing 3 volumes of methyl propyl ketone to 1 volume of gasoline and equal volumes of methyl ethyl ketone and gasoline.

The specific examples are to be regarded as merely illustrative of the invention, and not in any sense restrictive. It will be obvious to anyone skilled in the art that many modifications such as substituting equivalent materials and varying the proportions of materials used are within the spirit and scope of the invention as defined in the appended claims.

I claim:

1. A composition of matter containing neoprene dissolved in a dialkyl ketone containing at least four carbon atoms.
2. A composition of matter containing a mixture of neoprene and rubber dissolved in a dialkyl ketone containing at least four carbon atoms.

3. A composition of matter containing neoprene dissolved in methyl propyl ketone.

4. A composition of matter containing neoprene dissolved in a mixture of methyl propyl ketone and gasoline.

5. A composition of matter containing a mixture of neoprene and rubber dissolved in a solvent consisting of approximately equal proportions of methyl propyl ketone and gasoline.

ARTHUR W. BROWNE.